United States Patent [19]

Sowards

[11] Patent Number: 4,510,021

[45] Date of Patent: * Apr. 9, 1985

[54] FLUIDIZED BED CHARCOAL PARTICLE PRODUCTION SYSTEM

[75] Inventor: Norman K. Sowards, Coeur d'Alene, Id.

[73] Assignee: Energy Products of Idaho, Coeur d'Alene, Id.

[*] Notice: The portion of the term of this patent subsequent to Dec. 6, 2000 has been disclaimed.

[21] Appl. No.: 245,874

[22] Filed: Mar. 23, 1981

Related U.S. Application Data

[62] Division of Ser. No. 60,329, Jul. 25, 1979, abandoned.

[51] Int. Cl.³ .................. C10B 49/10; C10B 49/22; C10B 53/02
[52] U.S. Cl. .......................... 201/4; 201/12; 201/25; 201/31
[58] Field of Search .......... 201/2.5, 12, 21, 31, 201/4, 25, 39; 202/85, 91, 95, 121; 110/245; 34/10; 48/209, 111

[56] References Cited

U.S. PATENT DOCUMENTS

| | | | |
|---|---|---|---|
| 3,862,909 | 1/1975 | Copeland | 201/2.5 |
| 3,904,549 | 9/1975 | Barton et al. | 201/12 |
| 3,929,585 | 12/1975 | Grimmett | 201/2.5 |
| 3,977,947 | 8/1976 | Pyle | 201/31 |
| 4,029,550 | 6/1977 | Mitsui et al. | 201/2.5 |
| 4,060,041 | 11/1977 | Sowards | 110/245 |
| 4,078,973 | 3/1978 | Choi et al. | 201/2.5 |
| 4,082,615 | 4/1978 | Komuro et al. | 201/2.5 |
| 4,157,245 | 6/1979 | Mitchell et al. | 201/12 |

FOREIGN PATENT DOCUMENTS 2605904  8/1977  Fed. Rep. of Germany ........ 201/12

*Primary Examiner*—Bradley Garris
*Attorney, Agent, or Firm*—Lynn G. Foster

[57] ABSTRACT

A fluidized bed charcoal particle production system, including apparatus and method, wherein pieces of combustible waste, such as sawdust, fragments of wood, etc., are continuously disposed within a fluidized bed of a pyrolytic vessel. Preferably, the fluidized bed is caused to reach operating temperatures by use of an external pre-heater. The fluidized bed is situated above an air delivery system at the bottom of the vessel, which supports pyrolysis within the fluidized bed. Charcoal particles are thus formed within the bed from the combustible waste and are lifted from the bed and placed in suspension above the bed by forced air passing upwardly through the bed. The suspended charcoal particles and the gaseous medium in which the particles are suspended are displaced from the vessel into a cyclone mechanism where the charcoal particles are separated. The separated charcoal particles are quenched with water to terminate all further charcoal oxidation. The remaining off-gas is burned and, preferably, the heat therefrom used to generate steam, kiln dry lumber, etc. Preferably, the bed material is continuously recirculated and purified by removing tramp material.

6 Claims, 2 Drawing Figures

FLUIDIZED BED CHARCOAL PARTICLE PRODUCTION SYSTEM

CONTINUITY

This application is a division of my copending U.S. patent application Ser. No. 060,329, filed July 25, 1979, now abandoned.

BACKGROUND

1. Field of Invention

The present invention relates generally to pyrolysis and more particularly to a novel fluidized bed charcoal particle producing system, including both method and apparatus.

2. Prior Art

One prior proposal is known for obtaining charcoal from wood waste using a fluidized bed. See U.S. Pat. No. 3,929,585. Undesirably, this proposal requires premixing of bed material and wood refuse before introduction into a vessel containing a fluidized bed. It also requires that the bed material with charcoal commingled therewith be removed from the fluidized bed vessel and the charcoal physically separated from the bed material. The mentioned proposal has little or no commercial potential because the operation and equipment involved are bulky, costly and complex, and the operation fundamentally inefficient.

BRIEF SUMMARY AND OBJECTS OF THE INVENTION

In brief summary, the present invention comprises a low pollution fluidized bed charcoal particle producing system, including method and apparatus, wherein combustible waste is introduced into a fluidized bed within a vessel, particles of charcoal are pyrolytically formed within the bed and purged from the bed by upwardly directed forced air. Thus the charcoal particles are suspended in a gaseous medium comprising off-gas above the bed. The gaseous medium and the suspended charcoal particles are displaced by fluid flow to a cyclone mechanism where the charcoal particles are removed. Quenching of the removed charcoal particles using water is preferred to avoid any subsequent oxidation of the charcoal. It is also preferred to oxidize the off-gas and constructively use the heat derived therefrom.

With the foregoing in mind, it is a primary object of the present invention to provide a novel fluidized bed charcoal particle emission system, including method and apparatus.

It is a further object of the present invention to provide a novel fluidized bed charcoal system which does not require premixing of waste material and bed material prior to entry into a fluidized bed vessel and does not require joint removal of bed material and charcoal from the fluidized bed vessel for subsequent separation or direct removal of charcoal from the bed.

A further paramount object of the present invention is to provide a system by which charcoal is formed from combustible waste within a fluidized bed and removed therefrom by the use of pyrolysis gases.

A further principal object according to the present invention is the provision of a novel fluidized bed charcoal particle producing system whereby charcoal is formed in a fluidized bed within a vessel and removed from the vessel in off-gas suspension.

A further object of the present invention is the creation of charcoal within a fluidized bed, removal of the charcoal in a gaseous medium from the bed and subsequent separation of the charcoal from the gaseous medium.

A further important object of the present invention is the provision of a novel pyrolyzer system the effluent of which is charcoal particles suspended in combustible off-gas wherein the charcoal particles and the off-gas are separated and the off-gas burned.

A further object is the provision of fluid removal of charcoal created from combustible waste within a fluidized bed and the quenching of the charcoal following separation.

These and other objects and features of the present invention will be apparent from the detailed description taken with reference to the accompanying drawings.

DETAILED DESCRIPTION OF THE ILLUSTRATED EMBODIMENT

Figures 1, 2:
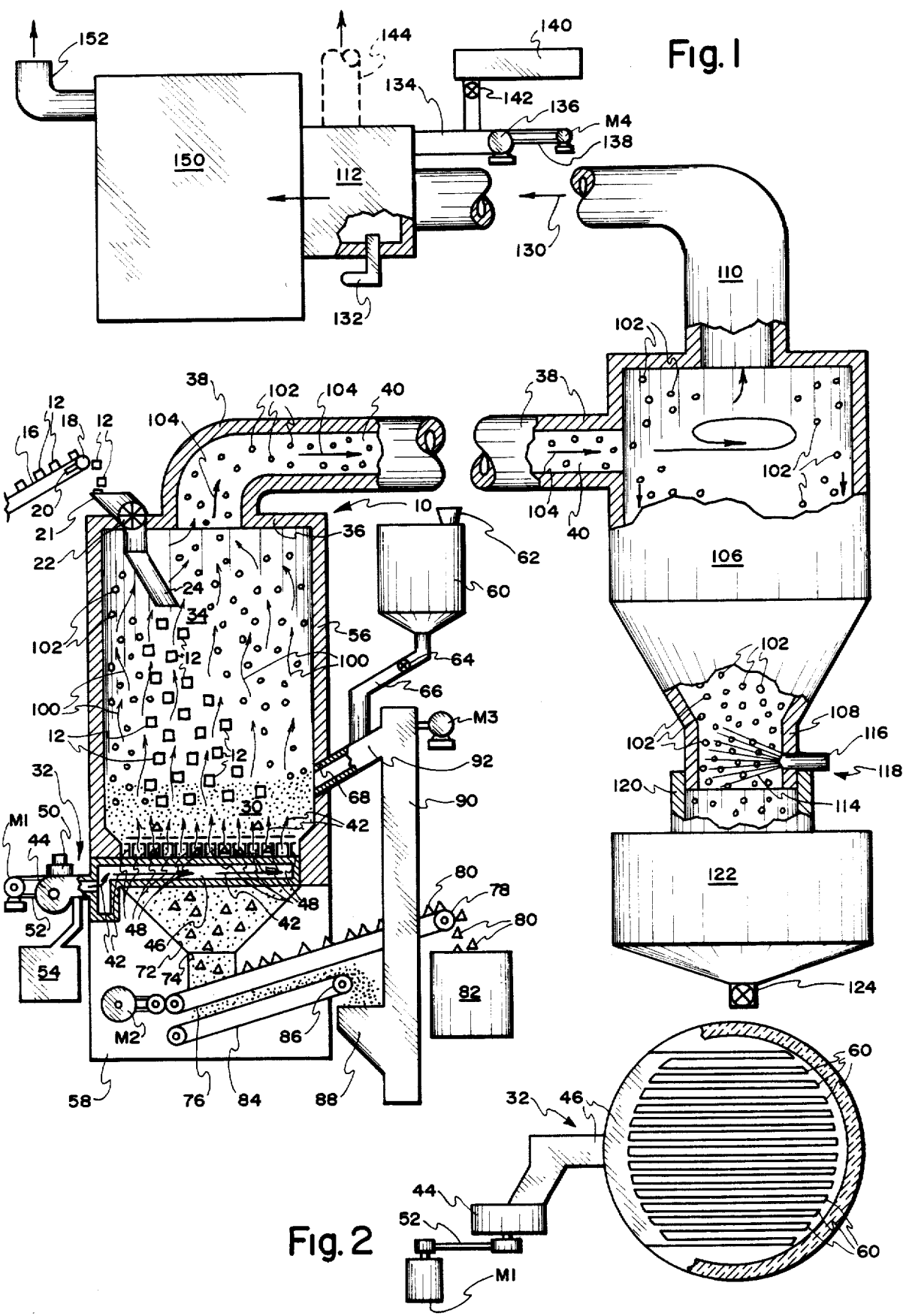
FIG. 1 is a schematic representation of a fluidized bed charcoal production and elutriation system, according to the present invention.
FIG. 2 is a cross section of the air distribution system within the fluidized bed vessel of FIG. 1.

Reference is now made to the drawings wherein like numerals are used to designate like parts throughout. Broadly, as shown in FIGS. 1-2, a pyrolysis fluidized bed vessel, generally designated 10, comprises an apparatus which continually receives particles 12 of combustible waste material, such as all types of wood residues, agricultural waste and municipal wastes. It is preferred that the size range of the segments of combustible waste 12 be within on the order of a range from sawdust to approximately three inches cubed for optimum production of charcoal. The influent combustible waste may have a moisture content within the range of forty (40) to on the order of fifty percent (50%) by weight on wet basis.

While it is to be appreciated that any form of conveyance may be used to transport the combustible waste particles 12 to the pyrolysis fluidized bed vessel 10, an endless belt conveyor 14 is illustrated in FIG. 1 as performing the conveying function. The conveyor 14 comprises an endless conveyor belt 16 conventionally driven and displaced around top roller 18. The roller 18 is illustrated as having associated therewith a commercially available control 20 by which the rate of delivery of combustible waste 12 may be selectively varied by the operator.

The combustible waste 12, therefore, falls by force of gravity from the top end of the conveyor 14 into a hopper or chute 21 which is equipped with a commercially available rotary air lock 22. Rotary air lock 22 allows entry of the combustible waste 12 into the interior of the vessel 10 without release of gas or pressure loss from the interior of the vessel along the chute 21. The interior 24 of the chute is illustrated as being disposed at an angle so that the combustible waste 12 which falls from the interior 24 of the chute will be caused to be evenly distributed as it falls upon and becomes embedded within the fluidized bed 30. The rate of rotation of the air lock 22 may also be controlled to in turn control the rate at which fuel (a combustible waste) is introduced into the vessel 10. Accordingly, the fuel portion of the fuel/air mixture is or may be controlled. Any other suitable system for distribution of the fuel particles 12 within the vessel and bed may be used, if desired.

A vapor zone 34 is disposed between the top of the fluidized bed 30 and the top 36 of the vessel 10. The vapor zone 34 is in fluid communication with a chimney 38 having a central passageway 40 for discharging pyrolysis off-gas. It is significant that the environment within the vessel 10 is controlled such that combustion of the volatiles and the like within the zone 34 is minimized due to rapid discharge. Since the process is continuous, the temperature of combustion within the fluidized bed 30 and the temperature of the vapor space 34 are preferably substantially equal, on the order of 900° F. to 1000° F. for pyrolysis of wood waste, for example.

An air delivery system, generally designated 32, drives or forces air under pressure as indicated by arrows 42 from a source 44 of pressurized air through a plenum 46 and an array of nozzles 48 upward through the bed 30. The source 44 of air under pressure is subject to a control 50 by which the rate of air displacement through the bed is selectively varied and set by the operator. Thus, both the fuel and air rates being introduced into the vessel 10 are selectively controlled and adjusted by the operator to achieve the proper state of pyrolysis preferably at an air/fuel ratio of 2. The source 44 may be a squirrel cage blower driven by motor M1 through V-belt 52.

The temperature of the bed 30 is initially raised to its operating level by high temperature air developed in pre-heater 54 and displaced by air under pressure from source 44 through the plenum 46 and nozzles 48 into the bed. The pre-heater 54 is preferably fueled by propane or natural gas. Once the fluidized bed 30 has reached the desired bed start up temperature, the pre-heater is switched off and the high capacity blower 44 continues to deliver ambient air to the fluidized bed which maintains the needed bed temperature through continuous oxidation of fuel particles 12.

The vessel 10 comprising top 36, a vertical cylindrical wall 56 and a base 58, each formed and fabricated in any suitable fashion consistent with existing fluidized bed technology. The right circular cylindrical wall 56 is preferably of sheet metal insulated by refractory material along the inside thereof preferably, the top 36 is likewise formed of sheet metal with refractory material along the interior thereof.

The material of which bed 30 is formed may be of any suitable inert fluidizable material capable of enduring without chemical or physical change the temperatures imposed upon the bed 30 and the vapor zone 34, i.e. on the order of within the range of 900° F. to 1000° F. It is preferred that the particle size of the bed material be within the range of on the order of 12 to 50 mesh, depending upon the size of fuel particles 12 to be introduced into the vessel 10 and the bed 30. The bed material is placed within the vessel 10 as illustrated in a pure state, i.e. without being comingled with fuel or any other extrinsic or foreign matter prior to introduction. To accommodate any loss of bed material during operation, a storage tank 60 containing a supplemental source of bed material is provided. This bed material is conventionally introduced into the tank 60 through an inlet 62 and, upon opening of valve 64 by the operator moves down a Z-shaped conduit 66 and into the bed through port 68. When the material of bed 30 has thus been amply supplemented, the valve 64 is once more closed by the operator.

As can be seen from FIG. 2, the air plenum 46 consists of a series of spaced hollow fingers 60, each finger servicing a plurality of the previously mentioned nozzles 48. In this fashion, the air from source 44 is substantially evenly distributed and caused to be directed evenly upwardly through the bed 30, as indicated generally by arrows 42, the ducts or fingers 60 being sized and shaped to ensure a uniform air flow and distribution into and through the bed 30.

The bed material and all foreign (tramp)material, e.g. rocks, gravel, steel and the like pass slowly though continuously between adjacent fingers or ducts 60 filling the space created by and being supported upon a cone shaped bin 72 comprising the upper tapered surface of the vessel base 58. The bin 72 has a major diameter equal to the diameter of the active bed of the vessel 10 and a lower minor diameter equal to and merging with a vertical passageway 74. The cone may be a static cone, a dynamic vibrating cone, a two section cone having both static and dynamic sections or two concentric cones, the inner cone having a hole size and spacing to provide for even and uniform draw-off of bed and tramp material across the total surface of the bed as hereinafter more fully described. The spout or passageway 74 discharges vertically upon a vibrating screen conveyor 76, which is driven by a motor M2 so as to oscillate. The screen conveyor 76 separates reusable bed material from tramp material 80 with the tramp material 80 proceeding up the conveyor 76, off the elevated end 78 into a tramp material container 82.

Reusable bed material passes through the mesh of the conveyor 76 onto a lower conveyor 84 and is discharged from the elevated end 86 thereof into a hopper 88 which in turn feeds a bucket elevator conveyor 90 on a continuous basis during operation of the tramp removal system. The return bed material is thus displaced upwardly in buckets of the conveyor 90 and ultimately returned to the bed 30 through chute 92. Chute 92 is in communication with the interior of the vessel 10 at vessel port 68. The chain of buckets comprising conveyor 90 are driven by motor M3. Thus tramp material is removed and bed material is continuously recirculated for reuse.

The vessel 10 is best operated by controlling and adjusting as necessary the fuel/air ratio introduced into the reaction chamber or vessel 10 so as to precipitate through the assistance of pre-heater 54 a state of full combustion within the bed 30 prior to pyrolysis. Once this state is achieved, the fuel/air ratio is again adjusted so that insufficient oxygen is provided to fully sustain full combustion in the bed for the fuel in question but to provide adequate energy from combustion to dry the fuel, if wet. Oxygen level being somewhat deficient, causes the volatilization process being slightly exothermic. The rate at which fuel 12 is introduced into the bed is likewise set so as to maintain bed temperature adequate for pyrolysis within the bed such that particles of charcoal are yielded having a determinable volatile content. It is to be appreciated that the mentioned control of the fuel/air ratio is the reverse of the combustion mode, i.e. once the pyrolysis mode is entered, any increase in the fuel feed rate causes a decrease in bed and vapor temperatures. A decrease in the fuel feed rate will cause an increase in the operating temperature of the bed and vapor space above the bed within the vessel 10. This is due to the fact that once the pyrolysis process goes beyond stoichometric conditions, additional fuel acts as a heat sink. By controlling the fuel/air ratio, the magnitude of the heat sink is correspondingly controlled to produce particles of charcoal.

In addition, the rate at which air from source 44 is caused to be vertically displaced upward through the bed 30 as illustrated by arrows 42 is a control factor—so that the charcoal particles so formed within the bed are lifted under force of the air upward out of the bed 30 into the vapor space 34 as illustrated by arrows 100. The particles of charcoal 102 are thus suspended by the force of the air, the charcoal particles 102, accordingly, becoming commingled with off-gas passing from the bed.

This composite of gaseous medium and charcoal particles is caused to pass as illustrated by arrows 104 along passageway 40 of exhaust conduit 38 to a charcoal separation cyclone 106. Here the charcoal particles 102 are separated from the off-gas by centrifugal force, the heavier charcoal particles passing from the cyclone 106 downwardly at outlet 108 under force of gravity and the off-gas passing from the cyclone 106 upwardly through chimney 110 to an after burner assembly 112.

Preferably, the high temperature particles of charcoal 102 are subjected to a spray 114 of water from nozzle 116 at quench site 118, illustrated as disposed at the outlet 108. By quenching the charcoal particles 102, any subsequent oxidation of the charcoal is terminated. The size of the outlet 108 should be sufficiently large to accommodate the quenching action described above without clogging at outlet 108, particularly when a high concentration of charcoal particles exists.

The quenched charcoal particles are caused, thereafter, to pass through an opening 120 into a charcoal receiver 122. It has been determined that the volatile content of the charcoal within storage tank 122 is normally on the order of ten to forty-seven percent by weight. Charcoal receiver 122 stores the charcoal particles to the extent desired. When the valve 124 of the charcoal storage tank 122 is open, a desired amount of charcoal is caused to be removed from the tank 122 and may be used, for example, to form a slurry with coal dust and/or other additives which are formed into brickets, etc.

It is to be appreciated that the fluid medium comprising off-gas, which is displaced as illustrated by arrow 130 through chimney 110 to after burner assembly 112, will have a temperature substantially the same as the temperature of the bed 30 and vapor space 34, i.e. on the order of 900° F.-1000° F. It is preferred that the burner assembly 112 comprise a gas pilot unit 132 and be located adjacent a site where the heat generated by the burner 112 may be constructively utilized. The pyrolysis gas entering the after burner 112 is combustible and is caused to be ignited by the existence of the gas pilot 132, under normal operating conditions. Full oxidation of the pyrolysis gas may be enhanced by introduction of additional air into the burner 112 through conduit 134, the source of said air being blower 136 powered by motor M4 through V-belt 138. In situations where full combustion of the pyrolysis gas otherwise proves to be difficult, a separate source of propane or natural gas at storage tank 140 may be used as supplemental fuel. Accordingly, upon the opening in whole or in part of valve 142, the propane or natural gas is introduced into the after burner assembly 112 and comingled with the pyrolysis gas to obtain full combustion. The gaseous exhaust from after burner 112 may be released directly to the atmosphere through vent 144, if desired. This effluent is low pollution and complies with all government regulations in respect thereto.

Preferably, however, the products of combustion from after burner 112 are delivered to a boiler, dryer or the like 150 to generate steam, to dry veneer, to kiln dry lumber, or the like. Thereafter, the equally clean though reduced temperature exhaust from boiler or dryer 150 is emitted directly to the atmosphere through vent 152. Since the temperature of the exhaust from after burner 112 is typically on the order of 1600° F. to 2200° F. (depending on the moisture content of the fuel being pyrolized and other operating conditions), the burner 112 constitutes a valuable source of heat for any one of a number of constructive uses.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A method of obtaining charcoal from combustible waste comprising the steps of:
    introducing combustible waste into a hot fluidized bed of inert non-carbonized material capable of enduring the bed temperature without physical or chemical change;
    creating particles of charcoal from the combustible waste within the inert fluidized bed by pyrolytic action;
    purging charcoal particles from the fluidized bed solely by elutriation caused solely by forced air passing upwardly through the fluidized bed thereby causing charcoal particles to be suspended above the bed in air and pyrolyzed gas;
    maintaining the charcoal particles in said state of suspension while displacing the charcoal particles, the air and the pyrolyzed gas to a location remote from the purging site;
    thereafter, separating the suspended charcoal particles from the air and pyrolyzed gas.

2. A method according to claim 1 further comprising the step of removing tramp material from the bed simultaneous with the creating, purging and maintaining steps.

3. A method according to claim 1 further comprising the step of quenching the separated charcoal particles to prevent subsequent charcoal oxidation.

4. A method according to claim 1 further comprising the step of selectively controlling on a continuous basis the rate at which combustible waste is introduced into the bed and the rate at which oxygen is available within the bed for formation of the charcoal particles through pyrolysis.

5. A method of obtaining charcoal from combustible waste comprising the steps of:
    introducing particles of combustible waste into a vapor space of a vessel so that the waste particles thereafter come to rest upon the top and work their way into the interior of a hot fluidized bed of inert granular particles disposed in the vessel;
    creating particles of charcoal from the combustible waste within the inert fluidized bed by pyrolytic action;

purging charcoal particles from the fluidized bed solely by elutriation and in no other way via forced air passing upwardly through the fluidized bed thereby causing charcoal particles to be suspended above the bed in air and pyrolyzed gas;

maintaining the charcoal particles in said state of suspension while displacing the charcoal particles, the air and the pyrolyzed gas from the vessel;

thereafter, separating the suspended charcoal particles from the air and pyrolyzed gas.

6. A method according to claim 5 further comprising removing bed and tramp materials from the bed, separating the tramp and bed materials and returning the separated bed material to the vessel.

* * * * *